(12) United States Patent
Gao et al.

(10) Patent No.: US 10,200,148 B1
(45) Date of Patent: Feb. 5, 2019

(54) SMART BEAMWIDTH ADAPTATION IN WIRELESS HEAD-MOUNTED DISPLAYS

(71) Applicant: Intel Corporation, Santa Clara, CA (US)

(72) Inventors: Jie Gao, Sunnyvale, CA (US); Yaniv Haim Frishman, Kiryat Ono (IL); Anand S. Konanur, San Jose, CA (US); Manish A. Hiranandani, Fremont, CA (US); Ulun Karacaoglu, San Diego, CA (US); Atsuo Kuwahara, Portland, OR (US); Songnan Yang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/719,057

(22) Filed: Sep. 28, 2017

(51) Int. Cl.
*H04B 1/00* (2006.01)
*H04B 15/00* (2006.01)
*H04L 1/00* (2006.01)
*H04L 1/20* (2006.01)
*H04W 16/28* (2009.01)

(52) U.S. Cl.
CPC .......... *H04L 1/0009* (2013.01); *H04L 1/0017* (2013.01); *H04L 1/0033* (2013.01); *H04L 1/206* (2013.01); *H04W 16/28* (2013.01)

(58) Field of Classification Search
CPC ..... H04L 1/0009; H04L 1/0033; H04L 1/206; H04L 1/0017; H04W 16/28
USPC .......................................... 455/63.4
See application file for complete search history.

(56) References Cited

U.S. PATENT DOCUMENTS

| 2017/0353849 | A1* | 12/2017 | Lim | H04W 8/02 |
| 2017/0359106 | A1* | 12/2017 | John Wilson | H04B 17/318 |
| 2017/0366311 | A1* | 12/2017 | Iyer | H04L 5/005 |
| 2018/0054611 | A1* | 2/2018 | Shin | G02B 27/017 |

* cited by examiner

*Primary Examiner* — Eugene Yun
(74) *Attorney, Agent, or Firm* — Schwegman Lundberg & Woessner, P.A.

(57) ABSTRACT

An apparatus and related operating method of a mmWave WHMD, are provided. The apparatus utilizes beamforming information to determine direction information indicating a direction of a received signal from an external component that is connected to the apparatus via a VR data link. The apparatus selects and sets a current MCS that supports a data load of the VR data link. The apparatus, while maintaining the VR data link, determines a VR data link condition by a determination that a received signal is stronger or weaker than a predetermined signal strength level for the current MCS of the VR data link. When stronger, the processing circuitry is configured to signal a transceiver to widen a beam from a current beamwidth to a new wider beamwidth in a direction based on the direction information to maintain the current MCS and data load of the VR data link.

25 Claims, 8 Drawing Sheets

SMART BEAMWIDTH ADAPTATION IN WIRELESS HEAD-MOUNTED DISPLAYS

TECHNICAL FIELD

The present disclosure relates to devices and methods for smart beamwidth adaptation in wireless head-mounted displays.

BACKGROUND

Virtual Reality (VR) is a rapidly advancing technical field that carries with it many technical demands—not the least of which is the high data transfer rate needed to provide a positive user experience. Fortunately, high-speed data transfer mechanisms are evolving to support the development of VR technology. In order to maximize a freedom of motion with respect to VR devices, wireless technologies are preferred over wired technologies to avoid limitations associated with a physically attached cable. WiGig is one protocol that may be able to deliver the high data rate supporting a positive VR experience. However, current WiGig radio front end modules (RFEMs) that are built for wireless docking applications generally do not meet key performance requirements for VR wireless head-mounted display (HMD) applications.

DETAILED DESCRIPTION

The following is a detailed description of various configurations depicted in the accompanying drawings. However, the amount of detail offered is not intended to limit anticipated variations of the described configurations, to the contrary, the claims and detailed description are to cover all modifications, equivalents, and alternatives falling within the spirit and scope of the present teachings as defined by the claims. The detailed descriptions below are designed to make such configurations understandable to a person having ordinary skill in the art.

To better meet the high-speed communication requirements for wireless HMD (WHMD) products, such as a mmWave wireless head-mounted device, various approaches are discussed herein that improve the user's experience when using such products. According to one implementation, a mechanism for dynamically modifying a data rate and beamwidth of a radio frequency (RF) signal may be employed to adjust to relatively rapid movement of a WHMD such that the benefits of high-speed wireless communications may be realized in the VR environment. Although the term WHMD is used throughout this description, the WHMD represents just one example of a movable wireless user device (MWUD) that is described herein, and the same principles may be applied regardless of whether the device is head-mounted, wearable, or movable in some other way.

Figure 1:
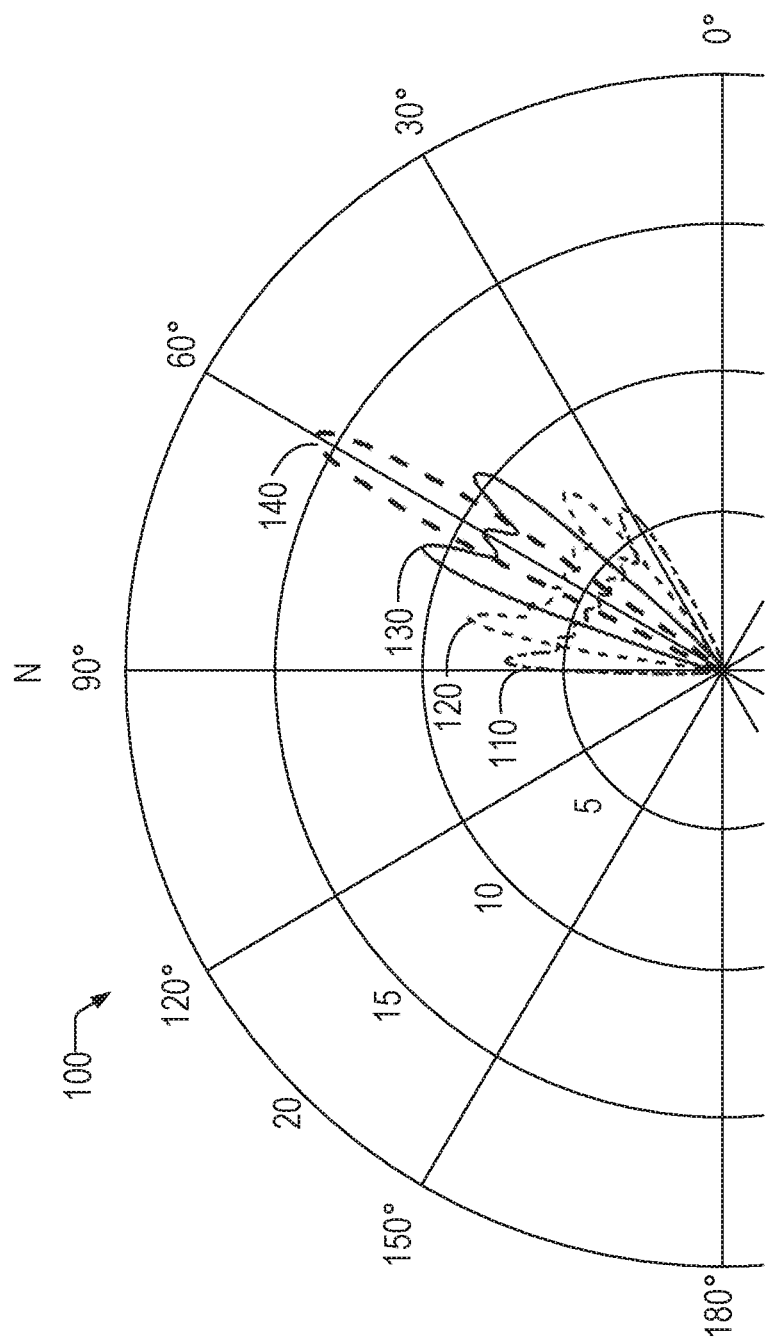
FIG. 1 is a graph illustrating beam patterns formed using different steering vectors in accordance with some aspects of the present disclosure.

FIG. 1 is a graph 100 illustrating four beam patterns with different beamwidths. Each beam pattern may be formed by applying specific steering vector to the antenna elements. The beams may be dynamically formed by, for example, a phased array antenna that, depending on how hard each element is driven and possibly combined with a phase difference, dictate a gain and direction of the formed beam. Not shown is an omni-directional beam in which the beam strength is equal in all directions and which may be formed by a single antenna.

With north at the top (90° position), the beam patterns illustrated are directed 30° to the east of north, at the 60° position, as shown. A first beam 110 illustrated is a 66° beam that may be formed using a first steering vector. A second beam 120 is a 45° beam that may be formed using a second steering vector. A third beam 130 is a 25° beam that may be formed using a third steering vector. Finally, a fourth beam 140 is an 8° beam that may be formed using a fourth steering vector. The narrower the beam, the more power a receiver in the beam direction receives for a given transmit power, and vice versa. It is preferable to use a high-gain, narrow beam signal in order to maximize transmitted and received power, provided the transmitter and receiver are able to stay within the narrow beam limits. For VR applications and MWUDs, however, the movement of communication devices creates a situation in which the devices may move outside of the narrow beam signal with a resultant significantly degraded signal.

Other related factors include the transmission mode and signal quality. Modulation schemes may be utilized that are able to deliver an effectively higher data rate, but these higher data rate schemes rely on a better signal quality (which may be measured, for example, by a signal-to-noise ratio (SNR)). Various Institute of Electrical and Electronics Engineers (IEEE) 802.11 protocol specifications identify Modulation and Coding Scheme (MCS) indexes, which are shorthand notations for modes of operation (modulation type, code rate, and physical data rate) for operating transceivers. For example, in the IEEE 802.11ad-2012 Standard (page 472, Clause 21.6.3.1.2, Table 21-18), these MCS indices, which range in value from MCS_1 to MCS_12, are an index into the type of modulation (e.g., binary phase-shift keying (BPSK), quadrature phase-shift keying (QPSK), 16QAM (quadrature amplitude modulation)), Code Rate and "raw" physical layer (PHY) rate that are available for each single carrier (SC) SC_PHY mode of operation. Table 1 is an MCS table that lists select Modulations, Code Rates, and PHY Rates for each MCS_Index for a single carrier PHY (other codes exist).

TABLE 1

Modulation and Coding Schemes (MCS) for 802.11ad Single Carrier PHY

| MCS Index | Modulation | Code Rate | PHY Rate (Mbps) |
|---|---|---|---|
| 1 | pi/2-BPSK | 1/2 | 385 |
| 7 | pi/2-BPSK | 1/2 | 770 |
| 3 | pi/2-BPSK | 5/8 | 962.5 |
| 4 | pi/2-BPSK | 3/4 | 1,155 |
| 5 | pi/2-BPSK | 13/16 | 1,251.2 |
| 6 | pi/2-QPSK | 1/2 | 1,540 |
| 7 | pi/2-QPSK | 5/8 | 1,925 |
| 8 | pi/2-QPSK | 3/4 | 2,310 |
| 9 | pi/2-QPSK | 13/16 | 2,502.5 |
| 10 | pi/2-6-QAM | 1/2 | 3,080 |
| 11 | pi/2-16-QAM | 5/8 | 3,850 |
| 12 | pi/2-16-QAM | 3/4 | 4,620 |

If the SNR is high, then higher-order modulation schemes, corresponding to higher MCS index numbers, may be used. Conversely, a lower SNR, representing a degraded signal, requires lower-order modulation schemes, corresponding to lower MCS index numbers need to be used. Table 1 may be stored in a memory of a device, and may include the MCS index numbers and any relevant parameters associated with the MCS index numbers, such as a predetermined signal strength level, an SNR, and a wireless link throughput.

Figure 2:
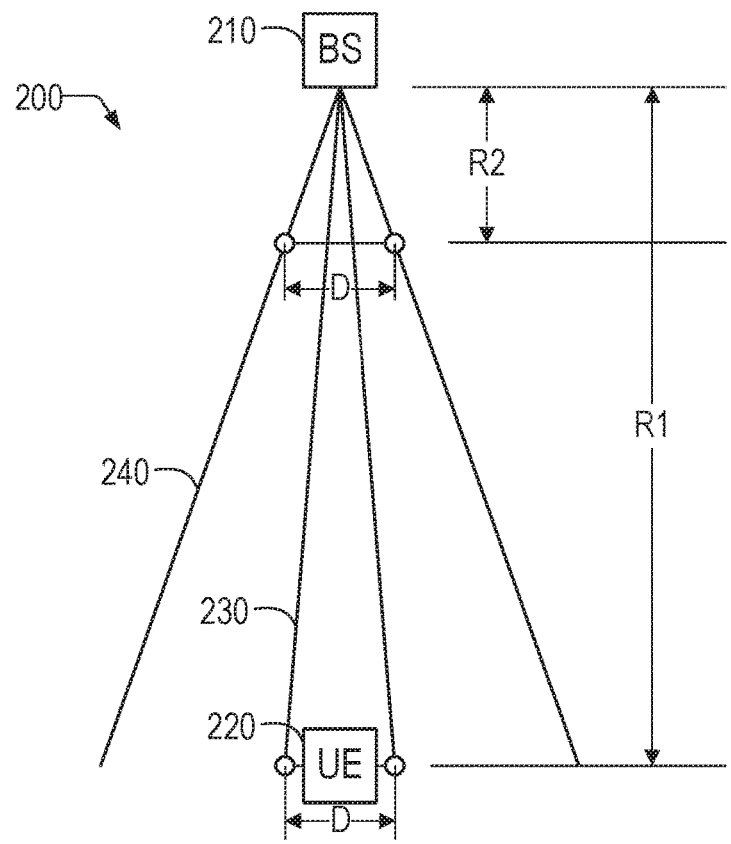
FIG. 2 is a pictorial diagram of a system that illustrates a beam-width versus distance issue with a beam source in accordance with some aspects of the present disclosure.

FIG. 2 is a pictorial diagram of a system 200 that illustrates a beam-width versus distance issue with a beam source. In FIG. 2, a base station (BS) 210 and user equipment (UE) 220 (such as the MWUD and WHMD) wirelessly communicate with each other over a high-speed wireless link. In a VR application, this may be a VR data link over which VR information is communicated. When the UE 220 is at a first distance R1 from the BS 210, a perpendicular motion (to the direction of the BS 210) having a distance D of the UE 220 fits within a narrow beamwidth 230, such as an 8° beamwidth. However, as the UE 220 moves closer to the BS 210, to a distance R2, the same perpendicular motion having a distance D falls well outside of the narrow beamwidth 230. It does, however, fall within a wider beamwidth 240.

Although it may be possible to utilize the narrower beamwidth 230 when the UE 220 is closer (at distance R2) to the BS 210, a rapid beam forming training and sector change would be required. This approach requires significant power and may not be fast enough to achieve optimal results. Therefore, another approach is to switch to a wider beam 240 when the UE 220 is closer to the BS 210, which may save power by reducing the frequency of beam forming training, (or conversely, increasing a beam forming training period) thereby providing a more robust wireless link.

Figure 3:
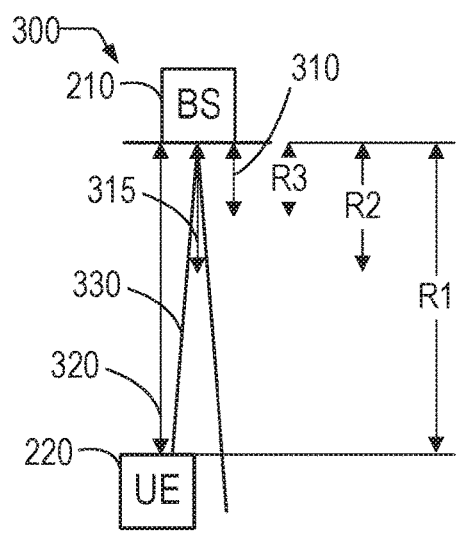
FIG. 3 is a pictorial diagram of a system that illustrates an approach in which a constant beamwidth is maintained in accordance with some aspects of the present disclosure.

FIG. 3 is a pictorial diagram of a system 300 that illustrates an approach in which a current MCS is modified based on a distance between the BS 210 and the UE 220, while the beamwidth 330 is maintained at a constant 8°. When the UE 220 is furthest from the BS 210, at distance R1 (320), which, by way of example, is 15', the maximum MCS that may be used is 8 to effectively communicate. When the UE 220 moves closer to the BS 210 to distance R2 (315), which, by way of example, is 10', the MCS may be increased to 10, since the closer distance means a stronger signal which minimizes the SNR. Finally, when the UE 220 moves closest to the BS 210 to distance R3 (310), which, by way of example, is 5', the MCS may be increased to 12. Thus, moving the UE 220 closer to the BS 210 increases the throughput by switching to a higher-order MCS, but only if the UE remains within the narrow beamwidth.

This system 300 is representative of a WiGig system, in which a phased array antenna forms narrow beams and provides high antenna gain in order to sustain the highest MCS for data transmission. The high MCS index requires strong signal power to decode packets correctly. A narrow beam (e.g., 8°) is generally not an issue for e.g., a back haul usage (that is, intermediate links between the core network, or backbone network and the small subnetworks at the "edge" of the network), as the mobile device is typically far away from the transmit tower and mobile device movement does not cause a rapid sector change rapidly. However, since VR is a close-distance application, movement of a VR UE 220 will require frequent sector changes when such a narrow beam is used and risks the UE 220 moving out of the beam due, thereby causing a poor SNR and error in packet reception.

Figure 4:
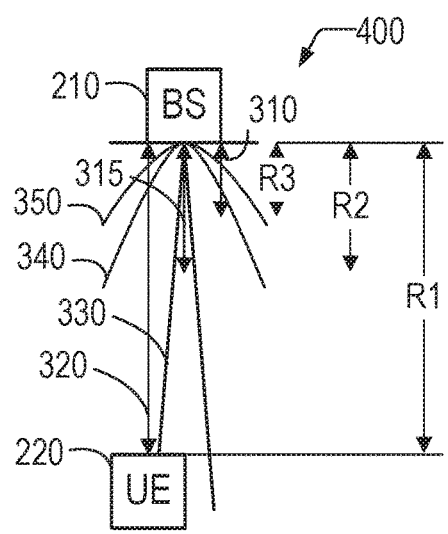
FIG. 4 is a pictorial diagram of a system that illustrates an approach in which a beamwidth is varied, in accordance with some aspects of the present disclosure.

FIG. 4 is a pictorial diagram of a system 400 that illustrates a different approach that may be more effective for VR applications. In this figure, when the UE 220 is furthest from the BS 210, at distance R1 (320) (15', as in FIG. 3), the conditions are the same as in FIG. 3, that is, the beamwidth is 8° and the MCS is 8. However, as the UE 220 moves closer to the BS 210, at distance R2 (315, at 10'), instead of increasing the MCS, as was done in the system 300 of FIG. 3, the MCS remains the same, and the beamwidth is increased to 45°, while maintaining the VR data link. As the UE 220 moves even closer to the BS 210, at distance R3 (310, at 5'), the MCS remains the same, and the beamwidth is increased to 66°. As noted above, by using a smart beamwidth adaptation, the antenna sector coverage is enlarged and the frequency of beam forming training and sector changing is reduced. A lower, but sufficient, MCS of the wireless link may be selected which compensates for the lower antenna gain as a result of the wider angle of coverage.

Comparing the two approaches for a VR UE 220, which may move at 200°/s with respect to the BS 210, maintaining the beam at 8°, as in the system 300 of FIG. 3, may require beam training every 40 ms, which is problematic in terms of throughput, power, and battery life. With the system 400 of FIG. 4, the beam training need only occur every 300 ms (beam training period). It is therefore possible to determine a width of the widened beam based on a predefined reduction of a training period, which is further based on detected motion of the apparatus relative to the external component. If the UE 220 does not exhibit a significant amount of lateral movement in a given time, as determined, e.g., by the position sensors, then the beam does not have to be widened as much for a 300 ms training period to maintain the VR data link. Conversely, if there is a significant amount of lateral movement in a given time, then the beam must be widened more for a 300 ms training period to maintain the VR data link. Alternately, or in addition, a greater amount of lateral movement may indicate that shorter training period, e.g., 150 ms, must be utilized. Any or all of these factors may be adjusted to maintain the VR data link.

Beamwidth adjustment may take place in the BS 210 or in the UE 220. It may take place in the UE 220, for example, when a user is wearing a head mounted display (HMD) and rotates his head from left to right (i.e., in a yaw motion). If the beam is narrow, the UE 220 has to frequently train and switch the beam, which halts the wireless link from transmitting any data during the training period.

In sum, the adjustments relate to a signal quality. The VR data link is first determined. The received signal may be a VR signal comprising data of a VR application running on the BS 210 and/or the UE 220. To achieve a particular signal quality, the transmit power may be adjusted, the MCS may be adjusted, and the beamwidth (related to antenna gain) may be adjusted. When the received signal quality exceeds that needed when operating the VR data link at a particular or a current MCS (i.e., the received signal is stronger than some predetermined signal strength level), one or more of the following may be done: the transmit power may be lowered, the MCS may be raised, or the beamwidth may be widened. Conversely, when the signal quality does not meet that needed when operating at a particular MCS (i.e., the received signal is weaker than some predetermined signal strength level), one or more of the following may be done: the transmit power may be raised, the MCS may be lowered, or the beamwidth may be narrowed. When the signal quality is at that needed when operating at a particular MCS, as described herein, it may still be desirable to widen the beam given the wide and rapid change in position of a UE in VR applications.

In order to maintain the signal quality with a wider beam (lower gain), the transmit power could be increased—however, to maintain the transmit power at a constant value, the MCS may be lowered to an optimum value to compensate for the wider beam. An optimum MCS provides a sufficient wireless link bandwidth or throughput to pass through the VR data rate successfully. By way of an example, the optimum MCS may correspond to an estimated wireless link throughput that may be the PHY rate*media access control (MAC) efficiency*duty cycle. A particular peak video encoder rate may be 900 Mbps as the estimated wireless link throughput. Substituting values in, an MCS index of 6 yields 1.54 Gbps*0.75*0.8=924 Mbps (just over the desired encoder rate).

As illustrated in FIG. 4, the system may determine the VR data link condition by a determination that a received signal is stronger or weaker than a predetermined signal strength level for the current MCS of the VR data link. When the VR data link condition indicates that the received signal is stronger by a first predetermined amount than the predetermined signal strength level, the processing circuitry may be configured to signal a transceiver to widen a beam from a current beamwidth to a new wider beamwidth in a direction based on the direction information to maintain the current MCS and data load of the VR data link. This widening may widen the current beamwidth up to a maximum amount that maintains the received signal as stronger than the predetermined signal strength level. When the VR data link condition indicates that the received signal is weaker by a second predetermined amount than the predetermined usable signal strength level, the processing circuitry may be configured to signal the transceiver to narrow the beam from the current beamwidth to a new narrower beamwidth in the direction based on the direction information to maintain the current MCS and data load of the VR data link.

The various approaches to maintaining acceptable signal quality may be combined. For example, after an initial attempt to maintain the current MCS in a widening or narrowing beamwidth operation, the processing circuitry may be further configured to send a second signal to the transceiver controller (also referred to herein as the transceiver for brevity) to lower the current MCS when a further widening signal is sent to the transceiver controller to further widen the beam, and/or send a third signal to the transceiver controller to raise the MCS when a further narrowing signal is sent to the transceiver controller to further narrow the beam. In another example, after an initial attempt to maintain the current MCS in a widening or narrowing beamwidth operation, the processing circuitry may be further configured to send a second signal to the transceiver controller to raise a transmit power when a further widening signal is sent to the transceiver controller to widen the beam, and/or send a third signal to the transceiver controller to lower a transmit power when a further narrowing signal is sent to the transceiver controller to narrow the beam.

Figure 5:
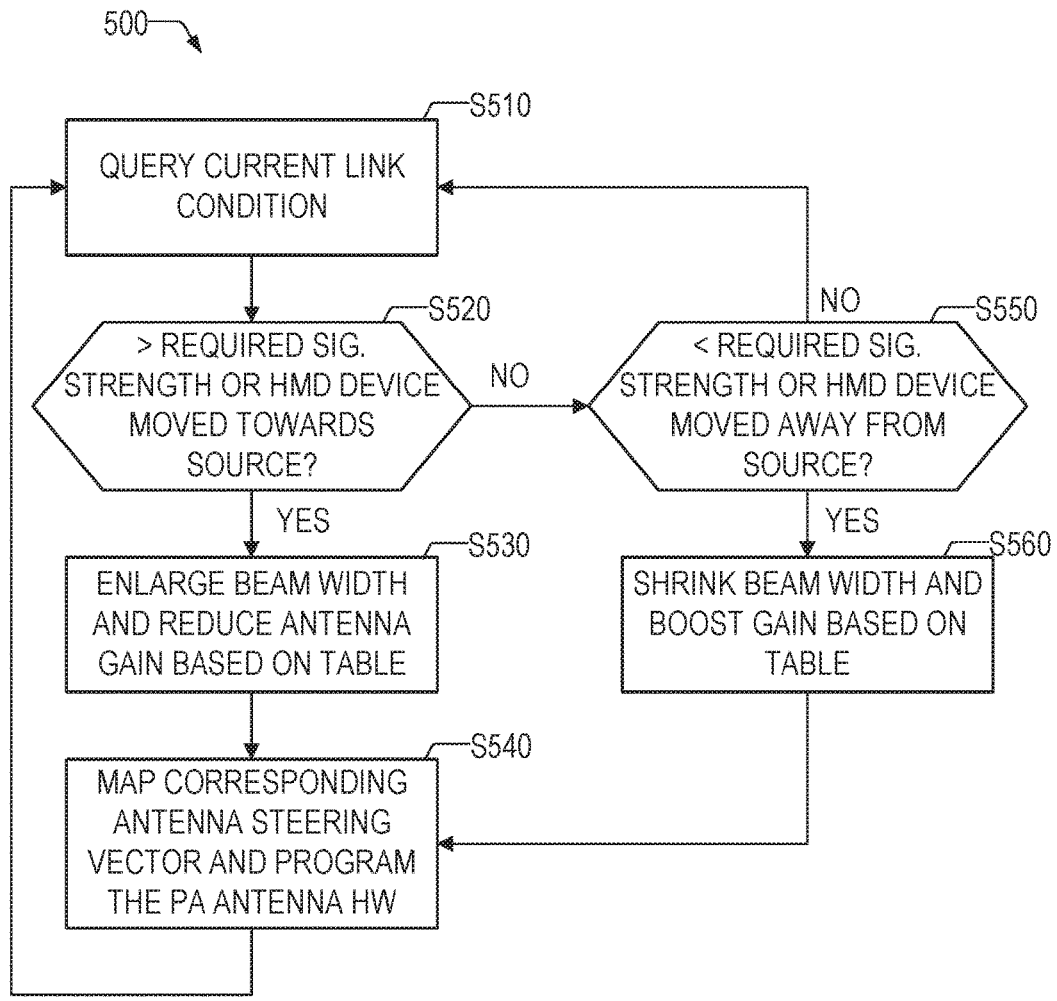
FIG. 5 is a flowchart that illustrates a process that may be utilized by the system, in accordance with some aspects of the present disclosure.

FIG. 5 is a flowchart 500 that illustrates an example of a process that may be utilized by the system 400. At operation S510, the system 400 may query a current link condition as well as additional information about the environment. Link conditions may be determined from a signal quality criteria, for example, a received signal strength indicator (RSSI), SNR, MCS, and packet error rate (PER), or any other type of quality criteria. The additional information may include sensor and tracking information that includes position and motion values of the UE 220 such that future position and motion may be predicted.

In operation S520, a determination may be made as to whether a greater-than-required signal strength is present or whether the UE 220 is moving towards the BS 210. If so (S520:Y), then, in operation S530, the beamwidth may be selected to be enlarged with a corresponding reduction in antenna gain based on, for example, predefined values. If the result of operation S520 is no (S520:N), then, in operation S550, a determination may be made as to whether a less-than-required signal strength is present or whether the UE 220 is moving away from the BS 210. If so (S550:Y), then, in operation S560, the beamwidth may be selected to be reduced with a corresponding increase in antenna gain based on, for example, predefined values. If not (S550:N), then the system may return to operation S510. In operation S540, the selected beamwidth from either operation S530 or S560 may be used to map the corresponding antenna steering vector (the beam direction may be determined by sensors and other factors, as described above) and program the antenna array controller accordingly. The process may then return to operation S510.

Table 2 below is a beamwidth table that may be stored in a device memory and provides an example of using predefined values for adjusting the beamwidth.

TABLE 2

Map of Antenna Gain to Beamwidth and Antenna Steering Vector Sequence

| Steering vector (beamwidth index) | Beamwidth | Antenna gain |
|---|---|---|
| #1 | 8° | X |
| ... | ... | ... |
| #5 | 25° | X − 4~5 dB |
| ... | ... | ... |
| #10 | 45° | X − 6~7 dB |
| ... | ... | ... |
| #15 | 66° | X − 8~9 dB |

The beamwidth table maps a beamwidth value to an antenna gain value and may be utilized to signal an amount of widening or narrowing of the beam based on a predetermined amount of the received signal.

By way of example, a current link condition is monitored, and provides a −51 dBm signal RSSI. However, the communications are operating with an MCS of 8, which requires a −61 dBm, meaning that there is a +10 dBm link margin. If the original beamwidth is 8° (using steering vector #1 from the table), then it is possible to switch from steering vector #1 to steering vector #15, thereby widening the beamwidth from 8° to 66° while still operating at the same MCS within the link condition requirements. Table 2 may be provided by way of a stored look-up table (LUT) that may be utilized to determine an appropriate beamwidth vs. antenna gain change. The beam may be widened to a maximum amount that still allows for necessary signal quality, e.g., that the signal is maintained as stronger than a predetermined usable (or optimum) signal strength level. In other words, the MCS in use may be set to an optimum MCS that is determined by a minimum wireless link bandwidth or throughput to pass through a data load.

Figure 6:
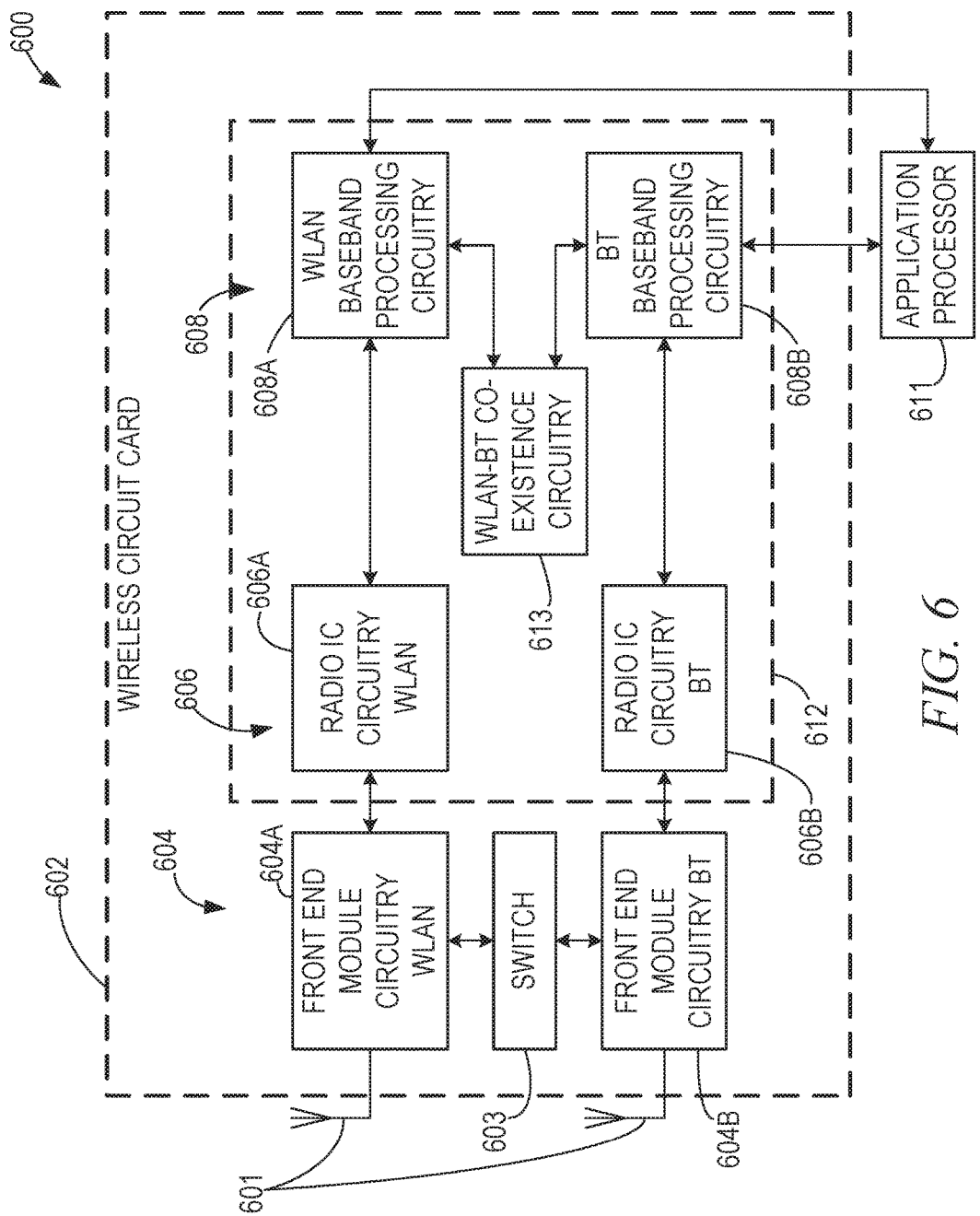
FIG. 6 is a block diagram of a radio architecture, in accordance with some aspects of the present disclosure.

FIG. 6 is a block diagram of a radio architecture 600 in accordance with some aspects of the present disclosure that may be used, for example, as a BS 210 and a UE 220, as described above. Radio architecture 600 may include radio FEM circuitry 604, radio IC circuitry 606 and baseband processing circuitry 608. Radio architecture 600 as shown includes both WLAN functionality and Bluetooth (BT) functionality although aspects disclosed herein are not so limited. In this disclosure, "WLAN" and "Wi-Fi" are used interchangeably.

FEM circuitry 604 may include a WLAN or Wi-Fi FEM circuitry 604A and a Bluetooth (BT) FEM circuitry 604B. The WLAN FEM circuitry 604A may include a receive signal path comprising circuitry configured to operate on WLAN RF signals received from one or more antennas 601, to amplify the received signals and to provide the amplified versions of the received signals to the WLAN radio IC circuitry 606A for further processing. The BT FEM circuitry 604B may include a receive signal path which may include circuitry configured to operate on BT RF signals received from one or more antennas 601, to amplify the received signals and to provide the amplified versions of the received signals to the BT radio IC circuitry 606B for further processing. FEM circuitry 604A may also include a transmit signal path which may include circuitry configured to amplify WLAN signals provided by the radio IC circuitry 606A for wireless transmission by one or more of the antennas 601. In addition, FEM circuitry 604B may also include a transmit signal path which may include circuitry configured to amplify BT signals provided by the radio IC circuitry 606B for wireless transmission by the one or more antennas. In an aspect of FIG. 6, although FEM 604A and FEM 604B are shown as being distinct from one another, various aspects are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 606 as shown may include WLAN radio IC circuitry 606A and BT radio IC circuitry 606B. The WLAN radio IC circuitry 606A may include a receive signal path which may include circuitry to down-convert WLAN RF signals received from the FEM circuitry 604A and provide baseband signals to WLAN baseband processing circuitry 608A. BT radio IC circuitry 606B may in turn include a receive signal path which may include circuitry to down-convert BT RF signals received from the FEM circuitry 604B and provide baseband signals to BT baseband processing circuitry 608B. WLAN radio IC circuitry 606A may also include a transmit signal path which may include circuitry to up-convert WLAN baseband signals provided by the WLAN baseband processing circuitry 608A and provide WLAN RF output signals to the FEM circuitry 604A for subsequent wireless transmission by the one or more antennas 601. BT radio IC circuitry 606B may also include a transmit signal path which may include circuitry to up-convert BT baseband signals provided by the BT baseband processing circuitry 608B and provide BT RF output signals to the FEM circuitry 604B for subsequent wireless transmission by the one or more antennas 601. In an aspect of FIG. 6, although radio IC circuitries 606A and 606B are shown as being distinct from one another, various aspects are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 608 may include a WLAN baseband processing circuitry 608A and a BT baseband processing circuitry 608B. The WLAN baseband processing circuitry 608A may include a memory, such as, for example, a set of RAM arrays in a Fast Fourier Transform or Inverse Fast Fourier Transform block (not shown) of the WLAN baseband processing circuitry 608A. Each of the WLAN baseband circuitry 608A and the BT baseband circuitry 608B may further include one or more processors and control logic to process the signals received from the corresponding WLAN or BT receive signal path of the radio IC circuitry 606, and to also generate corresponding WLAN or BT baseband signals for the transmit signal path of the radio IC circuitry 606. Each of the baseband processing circuitries 608A and 608B may further include physical layer (PHY) and medium access control layer (MAC) circuitry, and may further interface with application processor 611 for generation and processing of the baseband signals and for controlling operations of the radio IC circuitry 606.

Referring still to FIG. 6, according to the shown aspect, WLAN-BT coexistence circuitry 613 may include logic providing an interface between the WLAN baseband circuitry 608A and the BT baseband circuitry 608B to enable use cases requiring WLAN and BT coexistence. In addition, a switch 603 may be provided between the WLAN FEM circuitry 604A and the BT FEM circuitry 604B to allow switching between the WLAN and BT radios according to application needs. In addition, although the antennas 601 are depicted as being respectively connected to the WLAN FEM circuitry 604A and the BT FEM circuitry 604B, various aspects include within their scope the sharing of one or more antennas as between the WLAN and BT FEMs, or the provision of more than one antenna connected to each of FEM 604A or 604B.

In some various aspects, the front-end module circuitry 604, the radio IC circuitry 606, and baseband processing circuitry 608 may be provided on a single radio card, such as wireless radio card 602. In some other various aspects, the one or more antennas 601, the FEM circuitry 604 and the radio IC circuitry 606 may be provided on a single radio card. In some other various aspects, the radio IC circuitry 606 and the baseband processing circuitry 608 may be provided on a single chip or integrated circuit (IC), such as IC 612.

In some various aspects, the wireless radio card 602 may include a WLAN radio card and may be configured for Wi-Fi communications, although the scope of the various aspects is not limited in this respect. In some of these various aspects, the radio architecture 600 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier various aspects, radio architecture 600 may be part of a Wi-Fi communication station (STA) such as a wireless access point (AP), a base station or a mobile device including a Wi-Fi device. In some of these various aspects, radio architecture 600 may be configured to transmit and receive signals in accordance with specific communication standards and/or protocols, such as any of the Institute of Electrical and Electronics Engineers (IEEE) standards including, IEEE 802.11-2016, IEEE802.11n-2009, IEEE 802.11-2012, IEEE 802.11n-2009, 802.11ac, and/or 802.11ax standards and/or proposed specifications for WLANs, although the scope of various aspects is not limited in this respect. Radio architecture 600 may also be suitable to transmit and/or receive communications in accordance with other techniques and standards.

In some various aspects, the radio architecture 600 may be configured for high-efficiency (HE) Wi-Fi communications in accordance with the IEEE 802.11ax standard. In these various aspects, the radio architecture 600 may be configured to communicate in accordance with an OFDMA technique, although the scope of the various aspects is not limited in this respect.

In some other various aspects, the radio architecture 600 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the various aspects is not limited in this respect.

In some various aspects, as further shown in FIG. 6, the BT baseband circuitry 608B may be compliant with a Bluetooth (BT) connectivity standard such as Bluetooth, Bluetooth 4.0 or Bluetooth 5.0, or any other iteration of the Bluetooth Standard. In various aspects that include BT functionality as shown for example in FIG. 6, the radio architecture 600 may be configured to establish a BT synchronous connection oriented (SCO) link and or a BT low energy (BT LE) link. In some of the various aspects that include functionality, the radio architecture 600 may be configured to establish an extended SCO (eSCO) link for BT communications, although the scope of the various aspects is not limited in this respect. In some of these various aspects that include a BT functionality, the radio architecture may be configured to engage in a BT Asynchronous Connection-Less (ACL) communications, although the scope of the various aspects is not limited in this respect. In some various aspects, as shown in FIG. 6, the functions of a BT radio card and WLAN radio card may be combined on a single wireless radio card, such as single wireless radio card 602, although various aspects are not so limited, and include within their scope discrete WLAN and BT radio cards In some various aspects, the radio-architecture 600 may include other radio cards, such as a cellular radio card configured for cellular (e.g., 3$^{rd}$ Generation Partnership Project (3GPP) such as Long Term Evolution (LTE), LTE-Advanced or Fifth Generation (5G) communications).

In some IEEE 802.11 various aspects, the radio architecture 600 may be configured for communication over various channel bandwidths including bandwidths having center frequencies of about 900 MHz, 2.4 GHz, 5 GHz, and bandwidths of about 6 MHz, 2 MHz, 2.5 MHz, 4 MHz, 5 MHz, 8 MHz, 60 MHz, 66 MHz, 20 MHz, 40 MHz, 80 MHz (with contiguous bandwidths) or 80+80 MHz (160 MHz) (with non-contiguous bandwidths). In some various aspects, a 320 MHz channel bandwidth may be used. The scope of the various aspects is not limited with respect to the above center frequencies however.

Figure 7A:
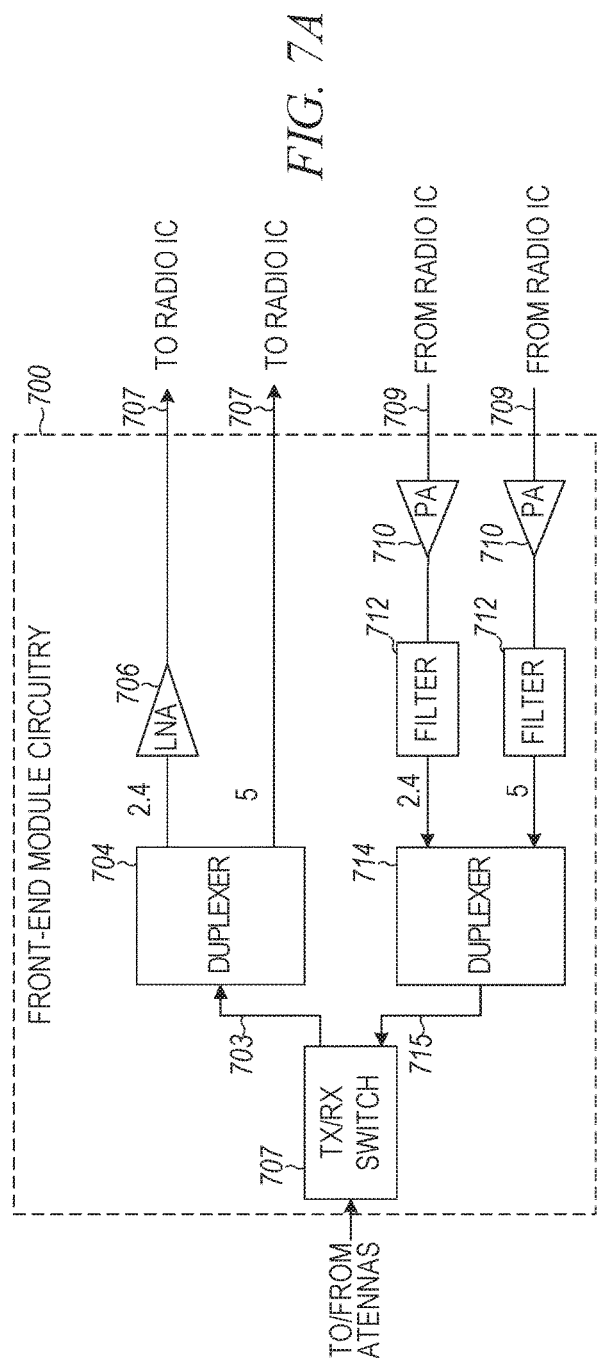
FIG. 7A illustrates front-end module (FEM) circuitry, in accordance with some aspects of the present disclosure.

FIG. 7A illustrates FEM circuitry 700 in accordance with some aspects of the present disclosure. The FEM circuitry 700 is one example of circuitry that may be suitable for use as the WLAN and/or BT FEM circuitry 604A/604B (FIG. 6), although other circuitry configurations may also be suitable.

In some various aspects, the FEM circuitry 700 may include a transmit/receive (TX/RX) switch 702 to switch between transmit mode and receive mode operation. The FEM circuitry 700 may include a receive signal path and a transmit signal path. The receive signal path of the FEM circuitry 700 may include a low-noise amplifier (LNA) 706 to amplify received RF signals 703 and provide the amplified RF signals 707 as an output (e.g., to the radio IC circuitry 606 (FIG. 6)). The transmit signal path of the circuitry 700 may include a power amplifier (PA) to amplify input RF signals 709 (e.g., provided by the radio IC circuitry 606), and one or more filters 712, such as band-pass filters (BPFs), low-pass filters (LPFs) or other types of filters, to generate RF signals 715 for subsequent transmission (e.g., by one or more of the antennas 601 (FIG. 6)).

In some dual-mode various aspects for Wi-Fi communication, the FEM circuitry 700 may be configured to operate in either the 2.4 GHz frequency spectrum or the 5 GHz frequency spectrum. In these various aspects, the receive signal path of the FEM circuitry 700 may include a receive signal path duplexer 704 to separate the signals from each spectrum as well as provide a separate LNA 706 for each spectrum as shown. In these various aspects, the transmit signal path of the FEM circuitry 700 may also include a power amplifier 710 and a filter 712, such as a BPF, a LPF or another type of filter for each frequency spectrum and a transmit signal path duplexer 714 to provide the signals of one of the different spectrums onto a single transmit path for subsequent transmission by the one or more of the antennas 601 (FIG. 6). In some various aspects, BT communications may utilize the 2.4 GHZ signal paths and may utilize the same FEM circuitry 700 as the one used for WLAN communications.

Figure 7B:
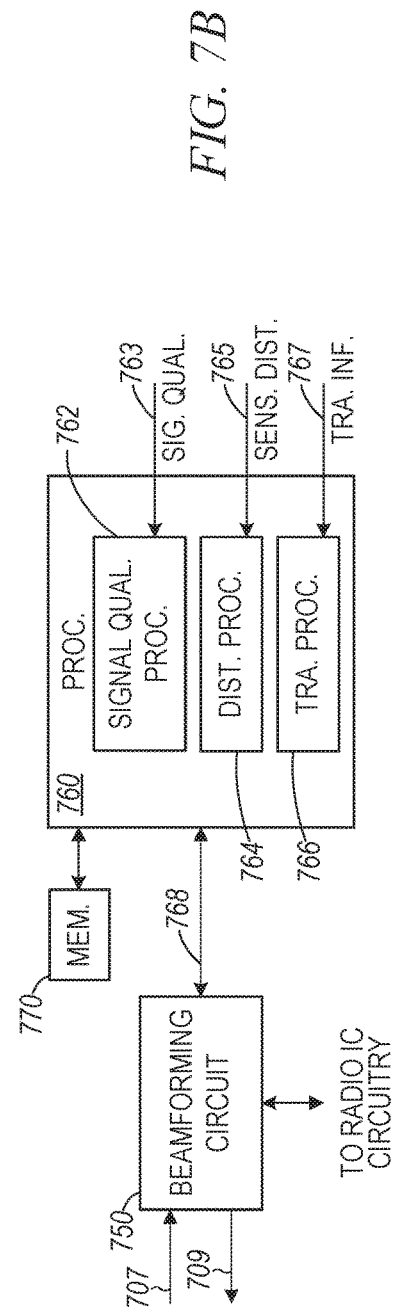
FIG. 7B illustrates circuitry for beamforming, in accordance with some aspects of the present disclosure.

FIG. 7B illustrates circuitry for beamforming in accordance with some aspects of the present disclosure. A beamforming circuit 750 may comprise known circuitry for adjusting a beam direction and a beamwidth of a phased array antenna based on known architectures. A processor 760, in addition to providing beam direction signals and beam direction information based on known beam training algorithms in a beamforming procedure, also utilizes a signal quality processor 762 that uses a signal quality input 763 to determine when the beam should be narrowed or widened. The quality may be determined, as discussed above, based on quality measurements such as the RSSI, the SNR, and the PER. When the signal quality exceeds that required for the operative MCS index, the beam may be widened until the gain is lowered by the widened beam to be approximately equal to the needed signal quality.

Additionally, the processor 760 may comprise a distance processor 764 that receives sensed distance information 765 about the distance between the BS 210 and the UE 220. The processing circuitry may be configured to receive and process a distance signal that indicates a distance between the wireless device and the external device at a first and second time. When the received distance signal indicates a smaller distance between the wireless device and the external device at the second time when compared to the first time, then the processing circuitry is configured to signal the transceiver to widen the beam. When the received distance signal indicates a larger distance between the wireless device and the external device at the second time when compared to the first time, then the processing circuitry is configured to signal the transceiver to narrow the beam. Thus, when the distance is reduced between a distance detected at a first time and a distance detected at a second time, the beam may be widened to have a lower gain. Conversely, when the distance is increased between a distance detected at a first time and a distance detected at a second time, the beam may be narrowed to have a higher gain.

The distance information may be obtained from position, velocity, and/or acceleration sensors 1121 (FIG. 11) associated with the BS 210 and UE 220.

Finally, the processor 760 may comprise a training processor 766 that may use training information input 767 to determine a frequency with which the beamforming training is occurring. A predefined parameter may define a target frequency at which the beamforming training is required, and the beamwidth may be adjusted to achieve the target frequency of beamforming. Relevant parameters and tables may be stored in a memory 770 associated with the processor 760 and the beamforming circuit 750.

The beamforming circuit 750 may receive a signal 768 indicating a beamwidth for a current transmission based on any individual or any combination of the signal quality processor 762, the distance processor 764, and the training processor 766.

Figure 8:
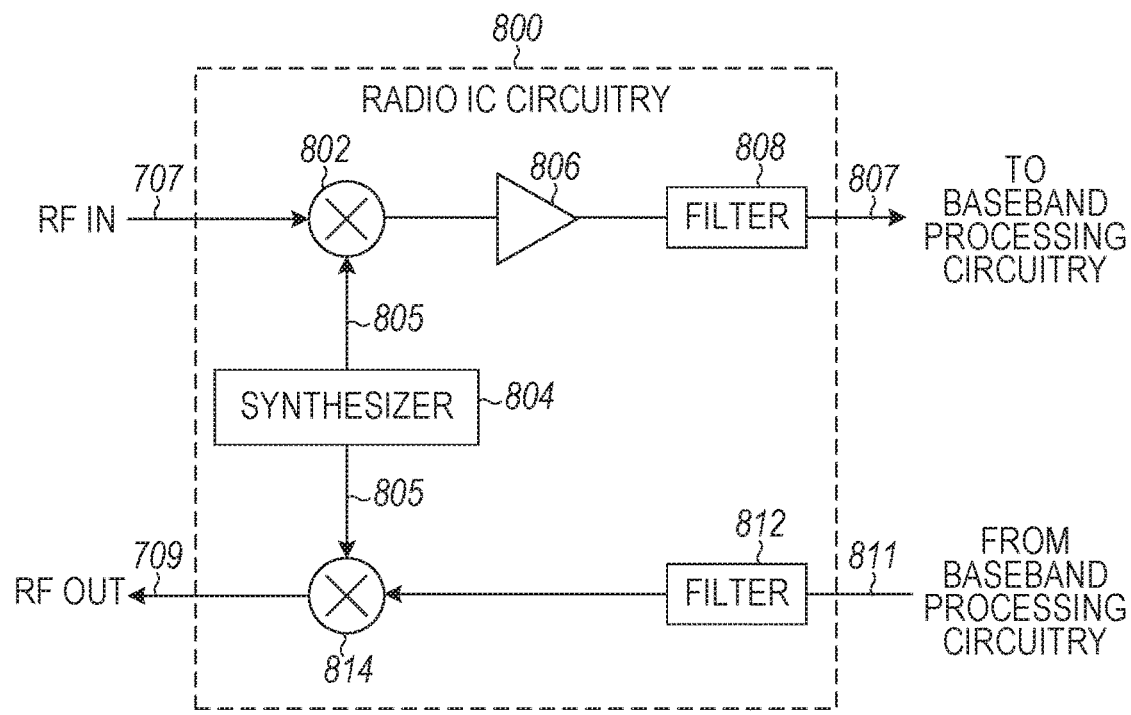
FIG. 8 illustrates radio IC circuitry, in accordance with some aspects of the present disclosure.

FIG. 8 illustrates radio IC circuitry 800 in accordance with some aspects of the present disclosure. The radio IC circuitry 800 is one example of circuitry that may be suitable for use as the WLAN or BT radio IC circuitry 606A/606B (FIG. 6), although other circuitry configurations may also be suitable.

In some various aspects, the radio IC circuitry 800 may include a receive signal path and a transmit signal path. The receive signal path of the radio IC circuitry 800 may include at least mixer circuitry 802, such as, for example, down-conversion mixer circuitry, amplifier circuitry 806 and filter circuitry 808. The transmit signal path of the radio IC circuitry 800 may include at least filter circuitry 812 and mixer circuitry 814, such as, for example, up-conversion mixer circuitry. Radio IC circuitry 800 may also include synthesizer circuitry 804 for synthesizing a frequency 805 for use by the mixer circuitry 802 and the mixer circuitry 814. The mixer circuitry 802 and/or 814 may each, according to some various aspects, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 8 illustrates a simplified version of a radio IC circuitry, and may include, although not shown, various aspects where each of the depicted circuitries may include more than one component. For instance, mixer circuitry 820 and/or 814 may each include one or more mixers, and filter circuitries 808 and/or 812 may each include one or more filters, such as one or more BPFs and/or LPFs according to application needs. For example, when mixer circuitries are of the direct-conversion type, they may each include two or more mixers.

In some various aspects, mixer circuitry 802 may be configured to down-convert RF signals 707 received from the FEM circuitry 604 (FIG. 6) based on the synthesized frequency 805 provided by synthesizer circuitry 804. The amplifier circuitry 806 may be configured to amplify the down-converted signals and the filter circuitry 808 may include a LPF configured to remove unwanted signals from the down-converted signals to generate output baseband signals 807. Output baseband signals 807 may be provided to the baseband processing circuitry 608 (FIG. 6) for further processing. In some various aspects, the output baseband signals 807 may be zero-frequency baseband signals, although this is not a requirement. In some various aspects, mixer circuitry 802 may comprise passive mixers, although the scope of the various aspects is not limited in this respect.

In some various aspects, the mixer circuitry 814 may be configured to up-convert input baseband signals 811 based on the synthesized frequency 805 provided by the synthesizer circuitry 804 to generate RF output signals 709 for the FEM circuitry 604. The baseband signals 811 may be provided by the baseband processing circuitry 608 and may be filtered by filter circuitry 812. The filter circuitry 812 may include a LPF or a BPF, although the scope of the various aspects is not limited in this respect.

In some various aspects, the mixer circuitry 802 and the mixer circuitry 814 may each include two or more mixers and may be arranged for quadrature down-conversion and/or up-conversion respectively with the help of synthesizer 804. In some various aspects, the mixer circuitry 802 and the mixer circuitry 814 may each include two or more mixers each configured for image rejection (e.g., Hartley image rejection). In some various aspects, the mixer circuitry 802 and the mixer circuitry 814 may be arranged for direct down-conversion and/or direct up-conversion, respectively. In some various aspects, the mixer circuitry 802 and the mixer circuitry 814 may be configured for super-heterodyne operation, although this is not a requirement.

Mixer circuitry 802 may comprise, according to one aspect: quadrature passive mixers (e.g., for the in-phase (I) and quadrature phase (Q) paths). In such an aspect, RF input signal 707 from FIG. 8 may be down-converted to provide I and Q baseband output signals to be sent to the baseband processor Quadrature passive mixers may be driven by zero and ninety degree time-varying local oscillator (LO) switching signals provided by a quadrature circuitry which may be configured to receive a LO frequency (fLO) from a local oscillator or a synthesizer, such as LO frequency 805 of synthesizer 804 (FIG. 8). In some various aspects, the LO frequency may be the carrier frequency, while in other various aspects, the LO frequency may be a fraction of the carrier frequency (e.g., one-half the carrier frequency, one-third the carrier frequency). In some various aspects, the zero and ninety degree time-varying switching signals may be generated by the synthesizer, although the scope of the various aspects is not limited in this respect.

In some various aspects, the LO signals may differ in duty cycle (the percentage of one period in which the LO signal is high) and/or offset (the difference between start points of the period). In some various aspects, the LO signals may have a 75% duty cycle and a 100% offset. In some various aspects, each branch of the mixer circuitry (e.g., the in-phase (I) and quadrature phase (Q) path) may operate at a 75% duty cycle, which may result in a significant reduction is power consumption.

The RF input signal 707 (FIG. 7) may comprise a balanced signal, although the scope of the various aspects is not limited in this respect. The I and Q baseband output signals may be provided to low-nose amplifier, such as amplifier circuitry 806 (FIG. 8) or to filter circuitry 808 (FIG. 8).

In some various aspects, the output baseband signals 807 and the input baseband signals 811 may be analog baseband signals, although the scope of the various aspects is not limited in this respect. In some alternate various aspects, the output baseband signals 807 and the input baseband signals 811 may be digital baseband signals. In these alternate various aspects, the radio IC circuitry may include analog-to-digital converter (ADC) and digital-to-analog converter (DAC) circuitry.

In some dual-mode various aspects, a separate radio IC circuitry may be provided for processing signals for each spectrum, or for other spectrums not mentioned here, although the scope of the various aspects is not limited in this respect.

In some various aspects, the synthesizer circuitry 804 may be a fractional-N synthesizer or a fractional N/N+1 synthesizer, although the scope of the various aspects is not limited in this respect as other types of frequency synthesizers may be suitable. For example, synthesizer circuitry 804 may be a delta-sigma synthesizer, a frequency multiplier, or a synthesizer comprising a phase-locked loop with a frequency divider. According to some various aspects, the synthesizer circuitry 804 may include digital synthesizer circuitry. An advantage of using a digital synthesizer circuitry is that, although it may still include some analog components, its footprint may be scaled down much more than the footprint of an analog synthesizer circuitry. In some various aspects, frequency input into synthesizer circuitry 804 may be provided by a voltage controlled oscillator (VCO), although that is not a requirement. A divider control input may further be provided by either the baseband processing circuitry 608 (FIG. 6) or the application processor 610 (FIG. 6) depending on the desired output frequency 805. In some various aspects, a divider control input (e.g., N) may be determined from a look-up table (e.g., within a Wi-Fi card) based on a channel number and a channel center frequency as determined or indicated by the application processor 610.

In some various aspects, synthesizer circuitry 804 may be configured to generate a carrier frequency as the output frequency 805, while in other various aspects, the output frequency 805 may be a fraction of the carrier frequency (e.g., one-half the carrier frequency, one-third the carrier frequency). In some various aspects, the output frequency 805 may be a LO frequency (fLO).

Figure 9:
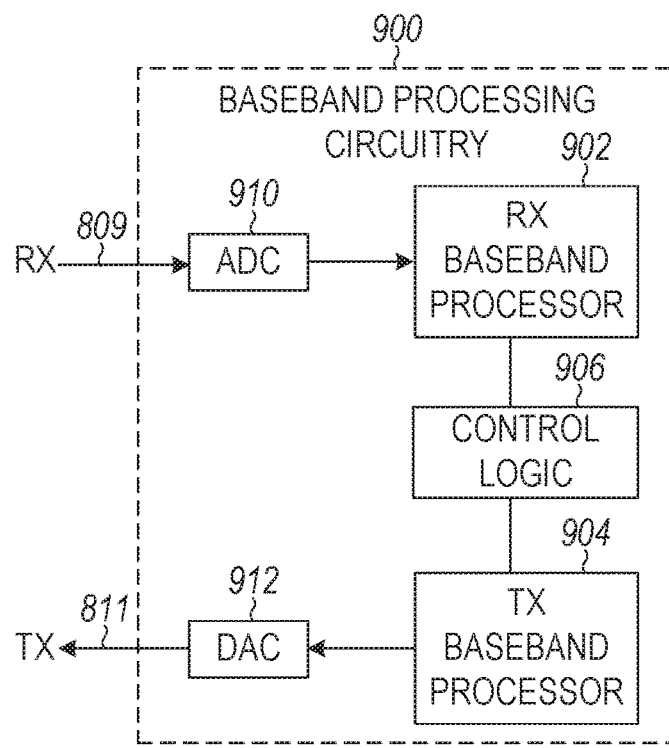
FIG. 9 illustrates a functional block diagram of baseband processing circuitry, in accordance with some aspects of the present disclosure.

FIG. 9 illustrates a functional block diagram of baseband processing circuitry 900 in accordance with some aspects of the present disclosure. The baseband processing circuitry 900 is one example of circuitry that may be suitable for use as the baseband processing circuitry 608 (FIG. 6), although other circuitry configurations may also be suitable. The baseband processing circuitry 900 may include a receive baseband processor (RX BBP) 902 for processing receive baseband signals 809 provided by the radio IC circuitry 606 (FIG. 6) and a transmit baseband processor (TX BBP) 904 for generating transmit baseband signals 811 for the radio IC circuitry 606. The baseband processing circuitry 900 may also include control logic 906 for coordinating the operations of the baseband processing circuitry 900.

In some various aspects (e.g., when analog baseband signals are exchanged between the baseband processing circuitry 900 and the radio IC circuitry 606), the baseband processing circuitry 900 may include ADC 910 to convert analog baseband signals received from the radio IC circuitry 606 to digital baseband signals for processing by the RX BBP 902. In these various aspects, the baseband processing circuitry 900 may also include DAC 912 to convert digital baseband signals from the TX BBP 904 to analog baseband signals.

In some various aspects that communicate OFDM signals or OFDMA signals, such as through baseband processor 608A, the transmit baseband processor 904 may be configured to generate OFDM or OFDMA signals as appropriate for transmission by performing an inverse Fast Fourier transform (IFFT). The receive baseband processor 902 may be configured to process received OFDM signals or OFDMA signals by performing an FFT. In some various aspects, the receive baseband processor 902 may be configured to detect the presence of an OFDM signal or OFDMA signal by performing an autocorrelation, to detect a pre-amble, such as a short preamble, and by performing a cross-correlation, to detect a long preamble. The preambles may be part of a predetermined frame structure for Wi-Fi communication.

Referring back to FIG. 6, in some various aspects, the antennas 601 (FIG. 6) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) various aspects, the antennas may be effectively separated to take advantage of spatial diversity and the different channel characteristics that may result. Antennas 601 may each include a set of phased-array antennas, although various aspects are not so limited.

Although the radio-architecture 600 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some various aspects, the functional elements may refer to one or more processes operating on one or more processing elements.

Figure 10:
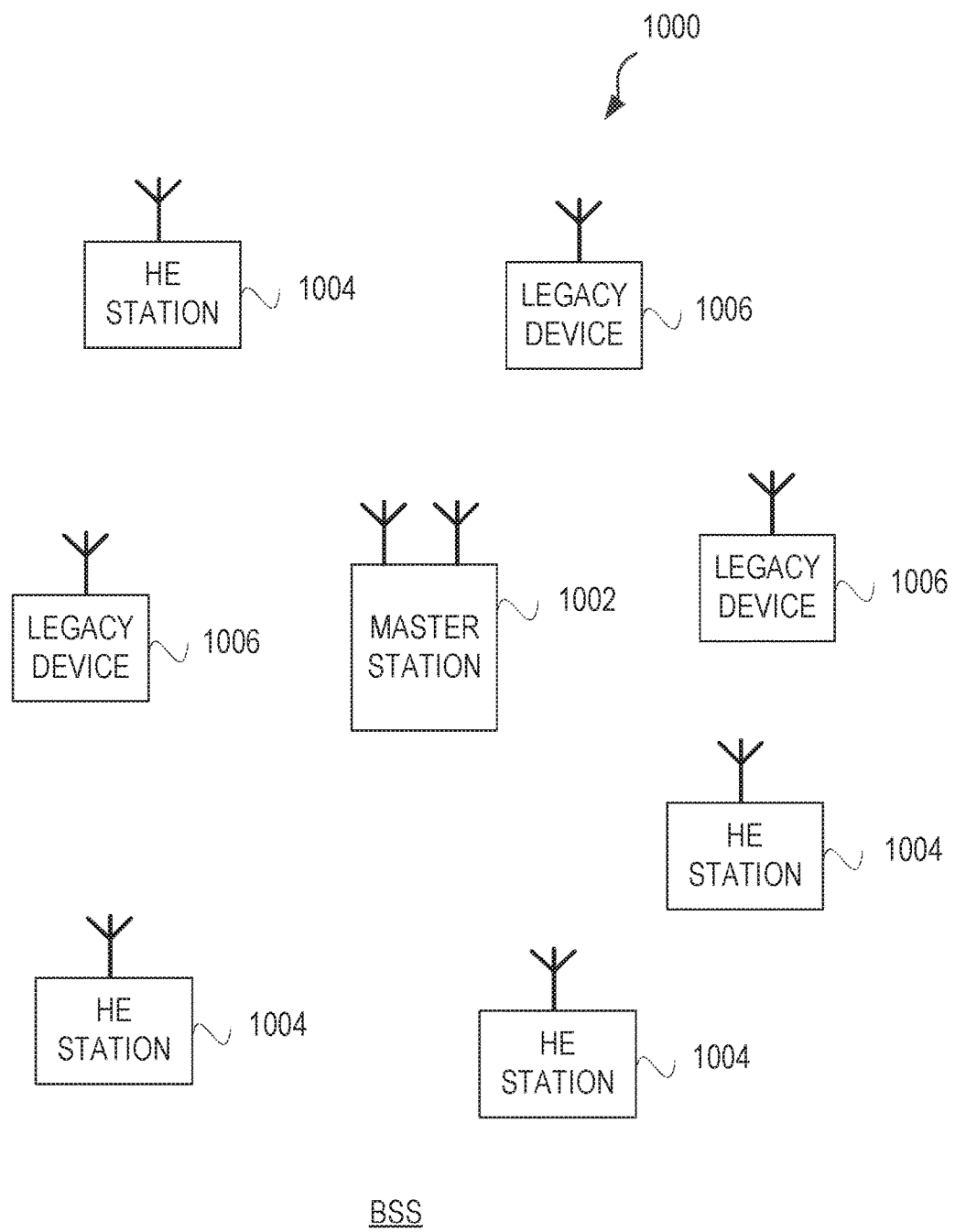
FIG. 10 illustrates a wireless local area network (WLAN), in accordance with some aspects of the present disclosure.

FIG. 10 illustrates a WLAN 1000 in accordance with some aspects of the present disclosure. The WLAN 1000 may comprise a basis service set (BSS) 1000 that may include a master station 1002, which may be an AP, a plurality of high-efficiency wireless (e.g., IEEE 802.11ax) (HE) stations 1004, and a plurality of legacy (e.g., IEEE 802.11n/ac) devices 1006.

The master station 1002 may be an AP using the IEEE 802.11 to transmit and receive. The master station 1002 may be a base station. The master station 1002 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one master station 1002 that is part of an extended service set (ESS). A controller (not illustrated) may store information that is common to the more than one master stations 1002.

The legacy devices 1006 may operate in accordance with one or more of IEEE 802.11 a/b/g/n/ac/ad/af/ah/aj/ay, or another legacy wireless communication standard. The legacy devices 1006 may be STAs or IEEE STAs. The HE STAs 1004 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some various aspects, the HE STAs 1004 may be termed high efficiency (HE) stations.

The master station 1002 may communicate with legacy devices 1006 in accordance with legacy IEEE 802.11 communication techniques. In example various aspects, the master station 1002 may also be configured to communicate with HE STAs 1004 in accordance with legacy IEEE 802.11 communication techniques.

In some various aspects, a HE frame may be configurable to have the same bandwidth as a channel. The HE frame may be a physical Layer Convergence Procedure (PLCP) Protocol Data Unit (PPDU). In some various aspects, there may be different types of PPDUs that may have different fields and different physical layers and/or different media access control (MAC) layers.

The bandwidth of a channel may be 70 MHz, 110 MHz, or 80 MHz, 660 MHz, 820 MHz contiguous bandwidths or an 80+80 MHz (160 MHz) non-contiguous bandwidth. In some various aspects, the bandwidth of a channel may be 6 MHz, 6.25 MHz, 7.03 MHz, 7.5 MHz, 11.06 MHz, 10 MHz and 60 MHz, or a combination thereof or another bandwidth that is less or equal to the available bandwidth may also be used. In some aspects, the bandwidth of the channels may be based on a number of active data subcarriers. In some various aspects, the bandwidth of the channels is based on 76, 102, 606, 742, 1184, 1196, or 7×996 active data subcarriers or tones that are spaced by 70 MHz. In some various aspects, the bandwidth of the channels is 756 tones spaced by 70 MHz. In some various aspects, the channels are multiple of 76 tones or a multiple of 70 MHz. In some various aspects, a 70 MHz channel may comprise 742 active data subcarriers or tones, which may determine the size of a FFT. An allocation of a bandwidth or a number of tones or sub-carriers may be termed a resource unit (RU) allocation in accordance with some aspects of the present disclosure.

In some various aspects, the 76-subcarrier RU and 102-subcarrier RU are used in the 70 MHz, 110 MHz, 80 MHz, 660 MHz and 80+80 MHz OFDMA HE PPDU formats. In some various aspects, the 606-subcarrier RU is used in the 70 MHz, 110 MHz, 80 MHz, 660 MHz and 80+80 MHz OFDMA and MU-MIMO HE PPDU formats. In some various aspects, the 742-subcarrier RU is used in the 110 MHz, 80 MHz, 660 MHz and 80+80 MHz OFDMA and MU-MIMO HE PPDU formats. In some various aspects, the 1184-subcarrier RU is used in the 80 MHz, 660 MHz and 80+80 MHz OFDMA and MU-MIMO HE PPDU formats. In some various aspects, the 1196-subcarrier RU is used in the 660 MHz and 80+80 MHz OFDMA and MU-MIMO HE PPDU formats.

An HE frame may be configured for transmitting a number of spatial streams, which may be in accordance with MU-MIMO and may be in accordance with OFDMA. In other various aspects, the master station 1002, HE STA 1004, and/or legacy device 1006 may also implement different technologies such as code division multiple access (CDMA) 7000, CDMA 7000 6x, CDMA 7000 Evolution-Data Optimized (EV-DO), Interim Standard 7000 (IS-2000), Interim Standard 115 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some various aspects relate to HE communications. In accordance with some IEEE 802.11 various aspects, e.g., IEEE 802.11ax various aspects, a master station 1002 may operate as a master station which may be arranged to contend for a wireless medium (e.g., during a contention period) to receive exclusive control of the medium for an HE control period. In some various aspects, the HE control period may be termed a transmission opportunity (TXOP). The master station 1002 may transmit a HE master-sync transmission, which may be a trigger frame or HE control and schedule transmission, at the beginning of the HE control period. The master station 1002 may transmit a time duration of the TXOP and sub-channel information. During the HE control period, HE STAs 1004 may communicate with the master station 1002 in accordance with a non-contention based multiple access technique such as OFDMA or MU-MIMO. This is unlike conventional WLAN communications in which devices communicate in accordance with a contention-based communication technique, rather than a multiple access technique. During the HE control period, the master station 1002 may communicate with HE stations 1004 using one or more HE frames. During the HE control period, the HE STAs 1004 may operate on a sub-channel smaller than the operating range of the master station 1002. During the HE control period, legacy stations refrain from communicating. The legacy stations may need to receive the communication from the master station 1002 to defer from communicating.

In accordance with some aspects of the present disclosure, during the TXOP the HE STAs 1004 may contend for the wireless medium with the legacy devices 1006 being excluded from contending for the wireless medium during the master-sync transmission. In some various aspects the trigger frame may indicate an uplink (UL) UL-MU-MIMO and/or UL OFDMA TXOP. In some various aspects, the trigger frame may include a downlink (DL) UL-MU-MIMO and/or DL OFDMA with a schedule indicated in a preamble portion of trigger frame.

In some various aspects, the multiple-access technique used during the HE TXOP may be a scheduled OFDMA technique, although this is not a requirement. In some various aspects, the multiple access technique may be a time-division multiple access (TDMA) technique or a frequency division multiple access (FDMA) technique. In some various aspects, the multiple access technique may be a space-division multiple access (SDMA) technique. In some various aspects, the multiple access technique may be a Code division multiple access (CDMA).

The master station 1002 may also communicate with legacy stations 1006 and/or HE stations 1004 in accordance with legacy IEEE 802.11 communication techniques. In some various aspects, the master station 1002 may also be configurable to communicate with HE stations 1004 outside the HE TXOP in accordance with legacy IEEE 802.11 communication techniques, although this is not a requirement.

In some various aspects the HE station 1004 may be a "group owner" (GO) for peer-to-peer modes of operation. A wireless device may be a HE station 1002 or a master station 1002.

In some various aspects, the HE station 1004 and/or master station 1002 may be configured to operate in accordance with IEEE 802.11mc. In example various aspects, the radio architecture of FIG. 6 is configured to implement the HE station 1004 and/or the master station 1002. In example various aspects, the front-end module circuitry of FIG. 7 is configured to implement the HE station 1004 and/or the master station 1002. In example various aspects, the radio integrated circuit (IC) circuitry of FIG. 8 is configured to implement the HE station 1004 and/or the master station 1002. In example various aspects, the base-band processing circuitry of FIG. 11 is configured to implement the HE station 1004 and/or the master station 1002.

Figure 11:
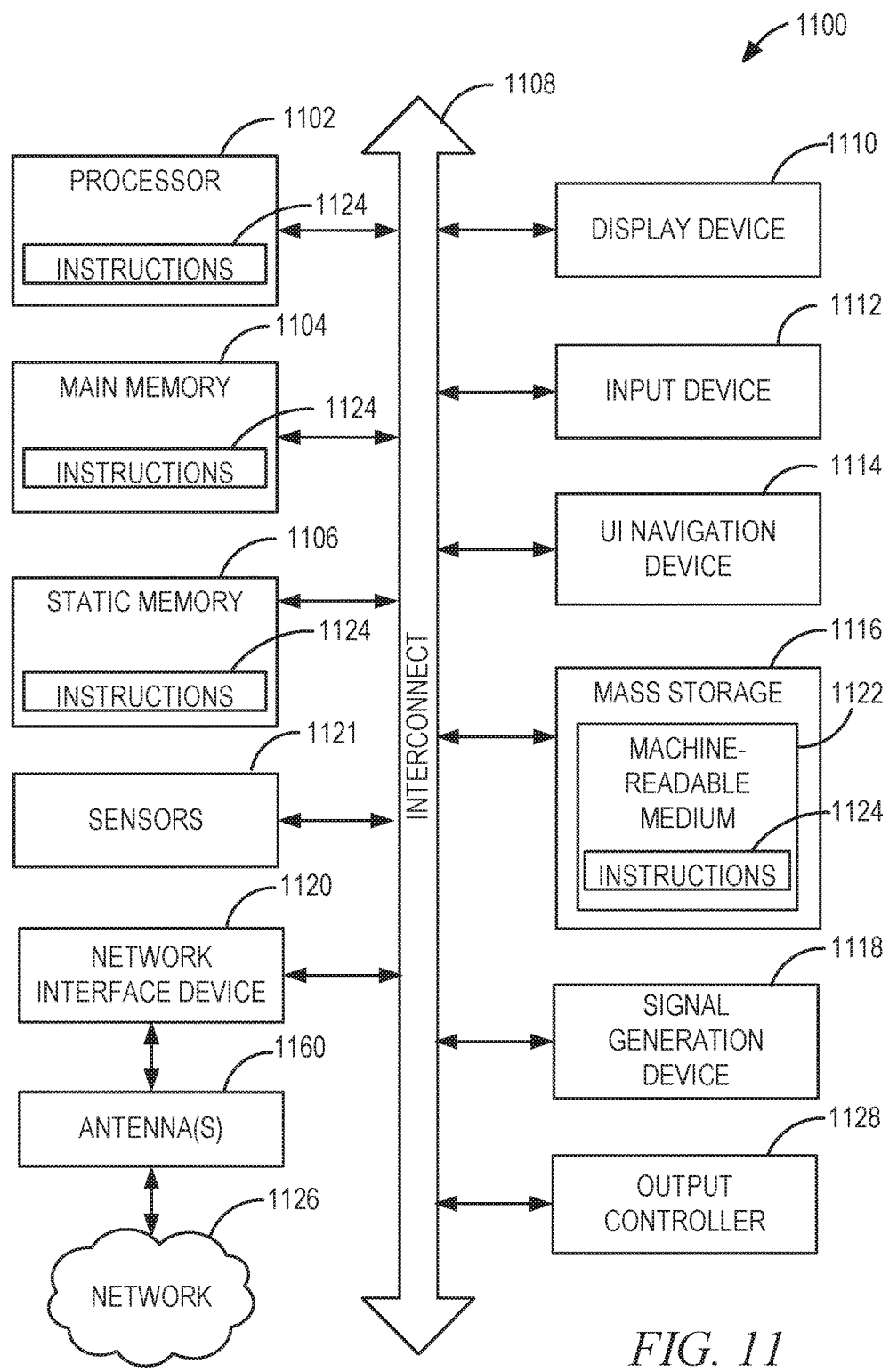
FIG. 11 illustrates a block diagram of a machine, in accordance with some aspects of the present disclosure.

In example various aspects, the HE stations 1004, master station 1002, an apparatus of the HE stations 1004, and/or an apparatus of the master station 1002 may include one or more of the following: the radio architecture of FIG. 6, the front-end module circuitry of FIG. 7, the radio IC circuitry of FIG. 8, and/or the base-band processing circuitry of FIG. 11.

In example various aspects, the radio architecture of FIG. 6, the front-end module circuitry of FIG. 7, the radio IC circuitry of FIG. 8, and/or the base-band processing circuitry of FIG. 9 may be configured to perform the methods and functions herein described in conjunction with FIGS. 1-5.

In example various aspects, the HE station 1004 and/or the master station 1002 are configured to perform the methods and functions described herein in conjunction with FIGS. 1-5. In example various aspects, an apparatus of the HE station 1004 and/or an apparatus of the master station 1002 are configured to perform the methods and functions described herein in conjunction with FIGS. 1-5. The term Wi-Fi may refer to one or more of the IEEE 802.11 communication standards. AP and STA may refer to HE access point 1002 and/or HE station 1004 as well as legacy devices 1006.

FIG. 11 is a block diagram of an example machine 1100 upon which any one or more of the techniques (e.g., methodologies) discussed herein may perform. In alternative various aspects, the machine 1100 may operate as a stand-alone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. The machine 1100 may be a master station 1002, HE station 1004, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108.

Specific examples of main memory 1104 include Random Access Memory (RAM), and semiconductor memory devices, which may include, in some various aspects, storage locations in semiconductors such as registers. Specific examples of static memory 1106 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 1100 may further include a display device 1110, an input device 1112 (e.g., a keyboard), and a user interface (UI) navigation device 1114 (e.g., a mouse). In an example, the display device 1110, input device 1112 and UI navigation device 1114 may be a touch screen display. The machine 1100 may additionally include a mass storage (e.g., drive unit) 1116, a signal generation device 1118 (e.g., a speaker), a network interface device 1120, and one or more sensors 1121, such as a global positioning system (GPS) sensor, compass, accelerometer, or other sensor. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some various aspects the processor 1102 and/or instructions 1124 may comprise processing circuitry and/or transceiver circuitry.

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the storage device 1116 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 1122 is illustrated as a single medium, the term "machine readable medium" may include a single medium or multiple media (e.g., a centralized or distributed database, and/or associated caches and servers) configured to store the one or more instructions 1124.

An apparatus of the machine 1100 may be one or more of a hardware processor 1102 (e.g., a central processing unit (CPU), a graphics processing unit (GPU), a hardware processor core, or any combination thereof), a main memory 1104 and a static memory 1106, sensors 1121, network interface device 1120, antennas 1160, a display device 1110, an input device 1112, a UI navigation device 1114, a mass storage 1116, instructions 1124, a signal generation device 1118, and an output controller 1128. The apparatus may be configured to perform one or more of the methods and/or operations disclosed herein. The apparatus may be intended as a component of the machine 1100 to perform one or more of the methods and/or operations disclosed herein, and/or to perform a portion of one or more of the methods and/or operations disclosed herein. In some various aspects, the apparatus may include a pin or other means to receive power. In some various aspects, the apparatus may include power conditioning hardware.

The term "machine readable medium" may include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 1120 may include one or more physical jacks (e.g., Ethernet, coaxial, or phone jacks) or one or more antennas to connect to the communications network 1126. In an example, the network interface device 1120 may include one or more antennas 1160 to wirelessly communicate using at least one of single-input multiple-output (SIMO), multiple-input multiple-output (MIMO), or multiple-input single-output (MISO) techniques. In some examples, the network interface device 1120 may wirelessly communicate using Multiple User MIMO techniques. The term "transmission medium" shall be taken to include any intangible medium that is capable of storing, encoding or carrying instructions for execution by the machine 1100, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some various aspects may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

For the purposes of promoting an understanding of the principles of this disclosure, reference has been made to the various configurations illustrated in the drawings, and specific language has been used to describe these configurations. However, no limitation of the scope of the inventive subject matter is intended by this specific language, and the inventive subject matter should be construed to encompass all various aspects and configurations that would normally occur to one of ordinary skill in the art. The configurations herein may be described in terms of functional block components and various processing steps. Such functional blocks may be realized by any number of components that perform the specified functions. The particular implementations shown and described herein are illustrative examples and are not intended to otherwise limit the scope of the inventive subject matter in any way. The connecting lines, or connectors shown in the various figures presented may, in some instances, be intended to represent example functional relationships and/or physical or logical couplings between the various elements. However, many alternative or additional functional relationships, physical connections or logical connections may be present in a practical device. Moreover, no item or component is essential unless the element is specifically described as "essential" or "critical". Numerous modifications and adaptations will be readily apparent to those skilled in this art.

Examples

Example 1 is an apparatus of a mmWave wireless head-mounted device (WHMD), the apparatus comprising: memory; and processing circuitry coupled to the memory, the processing circuitry configured to: utilize beamforming information to determine direction information indicating a direction of a received signal from an external component that is connected to the apparatus via a virtual reality (VR) data link; select and set a current modulation and coding scheme (MCS) that supports a data load of the VR data link; while maintaining the VR data link: determine a VR data link condition by a determination that a received signal is stronger or weaker than a predetermined signal strength level for the current MCS of the VR data link; when the VR data link condition indicates that the received signal is stronger by a first predetermined amount than the predetermined signal strength level, the processing circuitry is configured to signal a transceiver to widen a beam from a current beamwidth to a new wider beamwidth in a direction based on the direction information to maintain the current MCS and data load of the VR data link; and when the VR data link condition indicates that the received signal is weaker by a second predetermined amount than the predetermined signal strength level, the processing circuitry is configured to signal the transceiver to narrow the beam from the current beamwidth to a new narrower beamwidth in the direction based on the direction information to maintain the current MCS and data load of the VR data link.

In Example 2, the subject matter of Example 1 optionally includes wherein the signal to the transceiver to widen the beamwidth is configured to widen the current beamwidth up to a maximum amount that maintains the received signal as stronger than the predetermined signal strength level.

In Example 3, the subject matter of any one or more of Examples 1-2 optionally include wherein the VR data link condition is based on a signal quality criteria that is at least one of a received signal strength indication (RSSI), a signal-to-noise ratio (SNR), or a packet error rate (PER).

In Example 4, the subject matter of any one or more of Examples 1-3 optionally include wherein the processing circuitry is further configured to: send a second signal to the transceiver to lower the current MCS when a further widening signal is sent to the transceiver to further widen the beam; and send a third signal to the transceiver to raise the MCS when a further narrowing signal is sent to the transceiver to further narrow the beam.

In Example 5, the subject matter of Example 4 optionally includes wherein the memory is configured to store an MCS table in which MCS indexes are stored along with parameters associated with the MCS indexes, wherein the parameters include a predetermined related signal strength level, a signal-to-noise ratio (SNR), and a wireless link throughput.

In Example 6, the subject matter of any one or more of Examples 1-5 optionally include wherein the processing circuitry is further configured to: send a second signal to the transceiver to raise a transmit power when a further widening signal is sent to the transceiver to widen the beam; and send a third signal to the transceiver to lower a transmit power when a further narrowing signal is sent to the transceiver to narrow the beam.

In Example 7, the subject matter of any one or more of Examples 1-6 optionally include wherein the processing circuitry is further configured to: determine the VR data link condition by being configured to receive and process a received distance signal that indicates a distance between the wireless device and the external component at a first and second time; when the received distance signal indicates a smaller distance between the wireless device and the external component at the second time when compared to the first time, then the processing circuitry is configured to signal the transceiver to widen the beam; and when the received distance signal indicates a larger distance between the wireless device and the external component at the second time when compared to the first time, then the processing circuitry is configured to signal the transceiver to narrow the beam.

In Example 8, the subject matter of any one or more of Examples 1-7 optionally include wherein a width of the widened beam is determined based on a predefined reduction of a beam training period, which is based on detected motion of the apparatus relative to the external component.

In Example 9, the subject matter of Example 8 optionally includes wherein the beam training period is reduced to a value of 300 ms.

In Example 10, the subject matter of any one or more of Examples 1-9 optionally includes wherein the current beamwidth, the new wider beamwidth, and the new narrower beamwidth are between 8° and 66°.

In Example 11, the subject matter of any one or more of Examples 1-10 optionally include a beamwidth table stored in the memory that maps a beamwidth value to an antenna gain value and is utilized to signal an amount of widening or narrowing of the beam based on the first or the second predetermined amount of the received signal.

In Example 12, the subject matter of any one or more of Examples 1-11 optionally include wherein the received signal is a VR signal comprising data of a VR application running on at least one of the apparatus and the external component.

In Example 13, the subject matter of any one or more of Examples 1-12 optionally include wherein the MCS in use is an optimum MCS that is determined by a minimum wireless link bandwidth or throughput to pass through a data load.

Example 14 is a method performed by a processor of an apparatus of a wireless device, the method comprising: utilizing beamforming information to determine direction information indicating a direction of a received signal from an external component that is connected to the apparatus via a virtual reality (VR) data link; selecting and setting a current modulation and coding scheme (MCS) that supports a data load of the VR data link; while maintaining the VR data link: determining a VR data link condition by determining that the received signal is stronger or weaker than a predetermined signal strength level for the current MCS of the VR data link; when the VR data link condition indicates that the received signal is stronger by a first predetermined amount than the predetermined signal strength level, sending a widening signal to a transceiver to widen the beam from a current beamwidth to a new wider beamwidth in a direction based on the direction information to maintain the current MCS and data load of the VR data link; and when the VR data link condition indicates that the received signal is weaker by a second predetermined amount than the predetermined signal strength level, sending a narrowing signal to the transceiver to narrow the beam from the current beamwidth to a new narrower beamwidth in the direction based on the direction information to maintain the current MCS and data load of the VR data link.

In Example 15, the subject matter of Example 14 optionally includes wherein the signal to the transceiver to widen the current beamwidth causes the beam to be widened to a maximum amount that maintains the received signal as stronger than the predetermined signal strength level.

In Example 16, the subject matter of any one or more of Examples 14-15 optionally include wherein at least one of the determining that the VR data link condition is stronger than necessary or the determining that the VR data link condition is weaker than necessary is based on a signal quality criteria; the method further comprising: determining the signal quality criteria from at least one of a received signal strength indication (RSSI), a signal-to-noise ratio (SNR), or a packet error rate (PER).

In Example 17, the subject matter of any one or more of Examples 14-16 optionally include sending a second signal to the transceiver to lower the current MCS when sending the signal to the transceiver to further widen the beam; and sending a third signal to the transceiver to raise the current MCS when sending the signal to the transceiver to further narrow the beam.

In Example 18, the subject matter of Example 17 optionally includes storing an MCS table in a memory, in which MCS indexes are stored along with parameters associated with the MCS indexes, wherein the parameters include a predetermined signal strength level, a signal-to-noise ratio (SNR), and a wireless link throughput.

In Example 19, the subject matter of any one or more of Examples 14-18 optionally include sending a second signal to the transceiver to raise a transmit power when sending a further widening signal to the transceiver to widen the beam; and sending a third signal to the transceiver to lower a transmit power when sending a further narrowing signal to the transceiver to narrow the beam.

In Example 20, the subject matter of any one or more of Examples 14-19 optionally include wherein: determining the VR data link condition is performed by receiving and processing a distance signal that indicates a distance between the wireless device and the external component; when the received distance signal indicates a smaller distance between the wireless device and the external component, the VR data link condition indicates widening the beam; and when the received distance signal indicates a larger distance between the wireless device and the external component, the VR data link condition indicates narrowing the beam.

In Example 21, the subject matter of any one or more of Examples 14-20 optionally include determining a width of the widened beam based on a predefined reduction of a training period, that is based on detected motion of the apparatus relative to the external component.

In Example 22, the subject matter of any one or more of Examples 14-21 optionally include wherein the received signal is a VR signal comprising data of a VR application running on at least one of the apparatus and the external component.

In Example 23, the subject matter of any one or more of Examples 14-22 optionally include wherein the MCS in use is an optimum MCS that is determined by a minimum wireless link bandwidth or throughput to pass through the data load.

Example 24 is a computer-readable storage medium that stores instructions for execution by processing circuitry of an apparatus of a wireless device, the instructions to configure the one or more processors to cause the wireless device to: utilize beamforming information to determine direction information indicating a direction of a received signal from an external component that is connected to the apparatus via a virtual reality (VR) data link; select and set a current modulation and coding scheme (MCS) that supports a data load of the VR data link; while maintaining the VR data link: determine a VR data link condition by a determination that the received signal is stronger or weaker than a predetermined signal strength level for the current MCS of the VR data link; when the VR data link condition indicates that the received signal is stronger by a first predetermined amount than the predetermined signal strength level, the processing circuitry is configured to signal a transceiver to widen a beam from a current beamwidth to a new wider beamwidth in the direction based on the direction information to maintain the current MCS and data load of the VR data link; and when the VR data link condition indicates that the received signal is weaker by a second predetermined amount than the predetermined signal strength level, the processing circuitry is configured to signal the transceiver to narrow the beam from the current beamwidth to a new narrower beamwidth in the direction based on the direction information to maintain the current MCS and data load of the VR data link.

In Example 25, the subject matter of Example 24 optionally includes wherein the signal to the transceiver to widen the beamwidth is configured to widen the current beamwidth up to a maximum amount that maintains the received signal as stronger than the predetermined signal strength level.

Example 26 is a computer program product comprising one or more computer readable storage media comprising computer-executable instructions operable to, when executed by processing circuitry of a device, configure the device to perform any of the methods of Examples 14-23.

Example 27 is a system comprising means to perform any of the methods of Examples 14-23.

Example 28 is an apparatus of a mmWave wireless head-mounted device (WHMD), the apparatus comprising: means for utilizing beamforming information to determine direction information indicating a direction of a received signal from an external component that is connected to the apparatus via a virtual reality (VR) data link; means for selecting and setting a current modulation and coding scheme (MCS) that supports a data load of the VR data link; means for, while maintaining the VR data link: determining a VR data link condition by determining that a received signal is stronger or weaker than a predetermined signal strength level for the current MCS of the VR data link; when the VR data link condition indicates that the received signal is stronger by a first predetermined amount than the predetermined signal strength level, signaling a transceiver to widen a beam from a current beamwidth to a new wider beamwidth in a direction based on the direction information to maintain the current MCS and data load of the VR data link; and when the VR data link condition indicates that the received signal is weaker by a second predetermined amount than the predetermined signal strength level, signaling the transceiver to narrow the beam from the current beamwidth to a new narrower beamwidth in the direction based on the direction information to maintain the current MCS and data load of the VR data link.

In Example 29, the subject matter of Example 28 optionally includes wherein the signal to the transceiver to widen the beamwidth is configured to widen the current beamwidth up to a maximum amount that maintains the received signal as stronger than the predetermined signal strength level.

In Example 30, the subject matter of any one or more of Examples 28-29 optionally include wherein the VR data link condition is based on a signal quality criteria that is at least one of a received signal strength indication (RSSI), a signal-to-noise ratio (SNR), or a packet error rate (PER).

In Example 31, the subject matter of any one or more of Examples 28-30 optionally include wherein the apparatus further comprises: means for sending a second signal to the transceiver to lower the current MCS when a further widening signal is sent to the transceiver to further widen the beam; and means for sending a third signal to the transceiver to raise the MCS when a further narrowing signal is sent to the transceiver to further narrow the beam.

In Example 32, the subject matter of Example 31 optionally includes wherein the memory is configured to store an MCS table in which MCS indexes are stored along with parameters associated with the MCS indexes, wherein the parameters include a predetermined related signal strength level, a signal-to-noise ratio (SNR), and a wireless link throughput.

In Example 33, the subject matter of any one or more of Examples 28-32 optionally include wherein the apparatus further comprises: means for sending a second signal to the transceiver to raise a transmit power when a further widening signal is sent to the transceiver to widen the beam; and means for sending a third signal to the transceiver to lower a transmit power when a further narrowing signal is sent to the transceiver to narrow the beam.

In Example 34, the subject matter of any one or more of Examples 28-33 optionally include wherein the apparatus further comprises: means for determining the VR data link condition by being configured to receive and process a received distance signal that indicates a distance between the wireless device and the external component at a first and second time; when the received distance signal indicates a smaller distance between the wireless device and the external component at the second time when compared to the first time, means for signaling the transceiver to widen the beam; and when the received distance signal indicates a larger distance between the wireless device and the external component at the second time when compared to the first time, means for signaling the transceiver to narrow the beam.

In Example 35, the subject matter of any one or more of Examples 28-34 optionally include wherein a width of the widened beam is determined based on a predefined reduction of a beam training period, which is based on detected motion of the apparatus relative to the external component.

In Example 36, the subject matter of Example 35 optionally includes wherein the beam training period is reduced to a value of 300 ms.

In Example 37, the subject matter of any one or more of Examples 28-36 optionally include wherein the current beamwidth, the new wider beamwidth, and the new narrower beamwidth are between 8° and 66°.

In Example 38, the subject matter of any one or more of Examples 28-37 optionally include a beamwidth table stored in the memory that maps a beamwidth value to an antenna gain value and is utilized to signal an amount of widening or narrowing of the beam based on the first or the second predetermined amount of the received signal.

In Example 39, the subject matter of any one or more of Examples 28-38 optionally include wherein the received signal is a VR signal comprising data of a VR application running on at least one of the apparatus and the external component.

In Example 40, the subject matter of any one or more of Examples 28-39 optionally include wherein the MCS in use is an optimum MCS that is determined by a minimum wireless link bandwidth or throughput to pass through a data load.

In Example 41, at least one machine-readable medium including instructions, which when executed by a machine, cause the machine to perform operations of any of the operations of Examples 1-40.

In Example 42, a computer program product comprising one or more computer readable storage media comprising computer-executable instructions operable to, when executed by processing circuitry of a device, configure the device to perform any of the methods of Examples 14-23.

In Example 43, a system comprising means to perform any of the methods of Examples 14-23.

In Example 44, an apparatus comprising means for performing any of the operations of Examples 1-40.

In Example 45, a system to perform any of the operations of Examples 1-40.

In Example 46, a method to perform any of the operations of Examples 1-40.

The invention claimed is:

1. An apparatus of a mmWave wireless head-mounted device (WHMD), the apparatus comprising: memory; and processing circuitry coupled to the memory, the processing circuitry configured to:
   utilize beamforming information to determine direction information indicating a direction of a received signal from an external component that is connected to the apparatus via a virtual reality (VR) data link;
   select and set a current modulation and coding scheme (MCS) that supports a data load of the VR data link;
   while maintaining the VR data link:
   determine a VR data link condition by a determination that a received signal is stronger or weaker than a predetermined signal strength level for the current MCS of the VR data link;
   when the VR data link condition indicates that the received signal is stronger by a first predetermined amount than the predetermined signal strength level, the processing circuitry is configured to signal a transceiver to widen a beam from a current beamwidth to a new wider beamwidth in a direction based on the direction information to maintain the current MCS and data load of the VR data link; and
   when the VR data link condition indicates that the received signal is weaker by a second predetermined amount than the predetermined signal strength level, the processing circuitry is configured to signal the transceiver to narrow the beam from the current beamwidth to a new narrower beamwidth in the direction based on the direction information to maintain the current MCS and data load of the VR data link.

2. The apparatus of claim 1, wherein the signal to the transceiver to widen the beamwidth is configured to widen the current beamwidth up to a maximum amount that maintains the received signal as stronger than the predetermined signal strength level.

3. The apparatus of claim 1, wherein the VR data link condition is based on a signal quality criteria that is at least one of a received signal strength indication (RSSI), a signal-to-noise ratio (SNR), or a packet error rate (PER).

4. The apparatus of claim 1, wherein the processing circuitry is further configured to:
   send a second signal to the transceiver to lower the current MCS when a further widening signal is sent to the transceiver to further widen the beam; and
   send a third signal to the transceiver to raise the MCS when a further narrowing signal is sent to the transceiver to further narrow the beam.

5. The apparatus of claim 4, wherein the memory is configured to store an MCS table in which MCS indexes are stored along with parameters associated with the MCS indexes, wherein the parameters include a predetermined related signal strength level, a signal-to-noise ratio (SNR), and a wireless link throughput.

6. The apparatus of claim 1, wherein the processing circuitry is further configured to:
send a second signal to the transceiver to raise a transmit power when a further widening signal is sent to the transceiver to widen the beam; and
send a third signal to the transceiver to lower a transmit power when a further narrowing signal is sent to the transceiver to narrow the beam.

7. The apparatus of claim 1, wherein the processing circuitry is further configured to:
determine the VR data link condition by being configured to receive and process a received distance signal that indicates a distance between the wireless device and the external component at a first and second time;
when the received distance signal indicates a smaller distance between the wireless device and the external component at the second time when compared to the first time, then the processing circuitry is configured to signal the transceiver to widen the beam; and
when the received distance signal indicates a larger distance between the wireless device and the external component at the second time when compared to the first time, then the processing circuitry is configured to signal the transceiver to narrow the beam.

8. The apparatus of claim 1, wherein a width of the widened beam is determined based on a predefined reduction of a beam training period, which is based on detected motion of the apparatus relative to the external component.

9. The apparatus of claim 8, wherein the beam training period is reduced to a value of 300 ms.

10. The apparatus of claim 1, wherein the current beamwidth, the new wider beamwidth, and the new narrower beamwidth are between 8° and 66°.

11. The apparatus of claim 1, further comprising a beamwidth table stored in the memory that maps a beamwidth value to an antenna gain value and is utilized to signal an amount of widening or narrowing of the beam based on the first or the second predetermined amount of the received signal.

12. The apparatus of claim 1, wherein the received signal is a VR signal comprising data of a VR application running on at least one of the apparatus and the external component.

13. The apparatus of claim 1, wherein the MCS in use is an optimum MCS that is determined by a minimum wireless link bandwidth or throughput to pass through a data load.

14. A method performed by a processor of an apparatus of a wireless device, the method comprising:
utilizing beamforming information to determine direction information indicating a direction of a received signal from an external component that is connected to the apparatus via a virtual reality (VR) data link;
selecting and setting a current modulation and coding scheme (MCS) that supports a data load of the VR data link;
while maintaining the VR data link:
determining a VR data link condition by determining that the received signal is stronger or weaker than a predetermined signal strength level for the current MCS of the VR data link;
when the VR data link condition indicates that the received signal is stronger by a first predetermined amount than the predetermined signal strength level, sending a widening signal to a transceiver to widen the beam from a current beamwidth to a new wider beamwidth in a direction based on the direction information to maintain the current MCS and data load of the VR data link; and
when the VR data link condition indicates that the received signal is weaker by a second predetermined amount than the predetermined signal strength level, sending a narrowing signal to the transceiver to narrow the beam from the current beamwidth to a new narrower beamwidth in the direction based on the direction information to maintain the current MCS and data load of the VR data link.

15. The method of claim 14, wherein the signal to the transceiver to widen the current beamwidth causes the beam to be widened to a maximum amount that maintains the received signal as stronger than the predetermined signal strength level.

16. The method of claim 14, wherein at least one of the determining that the VR data link condition is stronger than necessary or the determining that the VR data link condition is weaker than necessary is based on a signal quality criteria; the method further comprising:
determining the signal quality criteria from at least one of a received signal strength indication (RSSI), a signal-to-noise ratio (SNR), or a packet error rate (PER).

17. The method of claim 14, further comprising:
sending a second signal to the transceiver to lower the current MCS when sending the signal to the transceiver to further widen the beam; and
sending a third signal to the transceiver to raise the current MCS when sending the signal to the transceiver to further narrow the beam.

18. The method of claim 17, further comprising storing an MCS table in a memory, in which MCS indexes are stored along with parameters associated with the MCS indexes, wherein the parameters include a predetermined signal strength level, a signal-to-noise ratio (SNR), and a wireless link throughput.

19. The method of claim 14, further comprising:
sending a second signal to the transceiver to raise a transmit power when sending a further widening signal to the transceiver to widen the beam; and
sending a third signal to the transceiver to lower a transmit power when sending a further narrowing signal to the transceiver to narrow the beam.

20. The method of claim 14, wherein:
determining the VR data link condition is performed by receiving and processing a distance signal that indicates a distance between the wireless device and the external component;
when the received distance signal indicates a smaller distance between the wireless device and the external component, the VR data link condition indicates widening the beam; and
when the received distance signal indicates a larger distance between the wireless device and the external component, the VR data link condition indicates narrowing the beam.

21. The method of claim 14, further comprising determining a width of the widened beam based on a predefined reduction of a training period, that is based on detected motion of the apparatus relative to the external component.

22. The method of claim 14, wherein the received signal is a VR signal comprising data of a VR application running on at least one of the apparatus and the external component.

23. The method of claim 14, wherein the MCS in use is an optimum MCS that is determined by a minimum wireless link bandwidth or throughput to pass through the data load.

24. A non-transitory computer-readable storage medium that stores instructions for execution by processing circuitry of an apparatus of a wireless device, the instructions to configure the one or more processors to cause the wireless device to:
- utilize beamforming information to determine direction information indicating a direction of a received signal from an external component that is connected to the apparatus via a virtual reality (VR) data link;
- select and set a current modulation and coding scheme (MCS) that supports a data load of the VR data link;
- while maintaining the VR data link:
- determine a VR data link condition by a determination that the received signal is stronger or weaker than a predetermined signal strength level for the current MCS of the VR data link;
- when the VR data link condition indicates that the received signal is stronger by a first predetermined amount than the predetermined signal strength level, the processing circuitry is configured to signal a transceiver to widen a beam from a current beamwidth to a new wider beamwidth in the direction based on the direction information to maintain the current MCS and data load of the VR data link; and
- when the VR data link condition indicates that the received signal is weaker by a second predetermined amount than the predetermined signal strength level, the processing circuitry is configured to signal the transceiver to narrow the beam from the current beamwidth to a new narrower beamwidth in the direction based on the direction information to maintain the current MCS and data load of the VR data link.

25. The non-transitory computer-readable storage medium of claim 24, wherein the signal to the transceiver to widen the beamwidth is configured to widen the current beamwidth up to a maximum amount that maintains the received signal as stronger than the predetermined signal strength level.

* * * * *